US009973139B2

(12) United States Patent
Goodman

(10) Patent No.: US 9,973,139 B2
(45) Date of Patent: May 15, 2018

(54) APPARATUSES, SYSTEMS, AND METHODS FOR AERODYNAMIC COUPLING OF SOLAR PANEL RACKING SYSTEMS

(71) Applicant: Quest Renewables, LLC, Atlanta, GA (US)

(72) Inventor: Joseph Neal Goodman, Snowmass, CO (US)

(73) Assignee: Quest Renewables, LLC, Atlanta, GA (US)

( * ) Notice: Subject to any disclaimer, the term of this patent is extended or adjusted under 35 U.S.C. 154(b) by 0 days. days.

(21) Appl. No.: 15/262,927

(22) Filed: Sep. 12, 2016

(65) Prior Publication Data

US 2017/0077864 A1    Mar. 16, 2017

Related U.S. Application Data

(60) Provisional application No. 62/217,404, filed on Sep. 11, 2015.

(51) Int. Cl.
*H02S 20/10*    (2014.01)
*F24J 2/52*    (2006.01)

(52) U.S. Cl.
CPC .............. *H02S 20/10* (2014.12); *F24J 2/5233* (2013.01); *Y02E 10/47* (2013.01)

(58) Field of Classification Search
CPC ................................ H02S 20/10; F24J 2/5233
USPC ........................................................ 136/244
See application file for complete search history.

(56) References Cited

U.S. PATENT DOCUMENTS

| 9,027,545 B2 | 5/2015 | Devillier |
| 9,413,287 B2* | 8/2016 | Hartelius ............... F24J 2/5233 |
| 2011/0005573 A1 | 1/2011 | Chang et al. |
| 2011/0121144 A1* | 5/2011 | Berbegal Pastor .... F24J 2/5232 |
| | | 248/185.1 |
| 2012/0160235 A1 | 6/2012 | Terry et al. |
| 2013/0192659 A1 | 8/2013 | Upton et al. |
| 2016/0173022 A1* | 6/2016 | Hirose .................... H02S 20/10 |
| | | 136/251 |

FOREIGN PATENT DOCUMENTS

| EP | 2071102 B1 | 1/2014 |
| JP | 2011159910 A | 8/2011 |
| WO | 2014135273 A1 | 9/2014 |
| WO | 2015025065 A1 | 2/2015 |

OTHER PUBLICATIONS

International Search Report and Written Opinion dated Dec. 7, 2016 in international patent application No. PCT/US16/51325.

* cited by examiner

*Primary Examiner* — Jayne L Mershon
(74) *Attorney, Agent, or Firm* — Morris, Manning & Martin, LLP; Daniel E. Sineway; R. Lee Strasburger, Jr.

(57) ABSTRACT

Apparatuses, systems, and methods for coupling adjacent solar canopies into a unitized structure to reduce wind loads on and increase the structural integrity of the solar canopies. In one embodiment, an array of two or more solar canopies may be divided into pairs of adjacent canopies, which are structurally coupled together.

25 Claims, 15 Drawing Sheets

APPARATUSES, SYSTEMS, AND METHODS FOR AERODYNAMIC COUPLING OF SOLAR PANEL RACKING SYSTEMS

CROSS REFERENCE TO RELATED APPLICATIONS

This application claims priority to, the benefit under 35 U.S.C. § 119 of, and incorporates by reference herein in its entirety U.S. Provisional Patent Application No. 62/217,404, filed Sep. 11, 2015, and entitled "Apparatuses, Systems, and Methods for Aerodynamic Coupling of Solar Panel Racking Systems."

TECHNICAL FIELD

The present apparatuses, systems, and methods relate generally to structural aerodynamics, and more particularly to novel coupling architectures and methodologies for solar panel racking systems.

BACKGROUND

Structural wind loads commonly govern the material requirements of solar panel racking systems (e.g., solar canopies, flat roof racking systems, etc.). Solar canopy technologies differ, however, from flat roof racking systems because the solar panels, in flat roof racking systems, are mounted directly onto a flat roof whereas the solar panels in solar canopies are mounted generally between 2 and 15 feet off of the ground. Solar canopy technologies may, for example, be used in any open public or private spaces such as parking lots, parks, sidewalks, playgrounds, parking garages, covered markets, equipment storage facilities, etc. Due to traditional steel erection methods and aerial installations, solar canopy technologies have yet to incorporate wind load reduction strategies.

Therefore, there is a long-felt but unresolved need for an apparatus, system, or method that effectively reduces wind loads on solar canopies.

BRIEF SUMMARY OF THE DISCLOSURE

Briefly described, and according to one embodiment, aspects of the present disclosure generally relate to apparatuses, systems, and methods for coupling adjacent solar canopies into a unitized structure to reduce wind loads on and increase the structural integrity of the solar canopies.

Generally, the disclosed apparatuses, systems, and methods utilize ground struts organized in a triangulated structure to attach a first solar canopy to the base of a second solar canopy and vice versa. In various embodiments, a solar canopy generally comprises a rectangular photovoltaic racking solution with at least one solar panel mounted on top of a triangular truss. Generally, the triangular truss comprises two upper chords (upon which the solar panel is mounted) and one lower chord, between which and to which various supports are attached. In various embodiments, the upper and lower chords of the triangular truss run the length of the rectangular solar canopies. At one end of the rectangular solar canopy, in one embodiment, the ground struts are used to attach the solar canopy to a mounting base on the ground. Similarly, at the other end of the rectangular solar canopy, in one embodiment, more of the ground struts are used to attach the solar canopy to another mounting base on the ground. In one embodiment, the truss and the ground struts are comprised of steel or other suitable material. As will occur to one having ordinary skill in the art, this disclosure places no limitations on the number, configurations, or types of solar canopies, solar panels, ground struts, or trusses that may be used in association with the present disclosure.

In one embodiment, the solar canopies are attached, via one or more upper-chord and lower-chord ground struts, to mounting bases resting or attached to the ground. To provide additional reduction of wind loads and increased structural integrity, adjacent solar canopies may be coupled together using one or more coupling ground struts. For example, a first coupling ground strut may be attached to a first solar canopy at one end and the mounting base of a second solar canopy at the other end. Similarly, a second coupling ground strut may be attached to the second solar canopy at one end and the mounting base of the first solar canopy at the other end. In various embodiments, by attaching a first solar canopy to a second solar canopy, the overall maximum wind loads on the solar canopies are reduced. By reducing the wind load on the solar canopies, the overall resistance required for the coupled solar canopies (to resist downforce and lift from the wind) is reduced. Thus, instead of building each solar canopy to resist a higher-maximum wind load, the solar canopies may be constructed to resist the lowered-maximum overall wind load—necessitating less materials, which affords a savings in cost for construction.

Any number of adjacent solar canopies may be generally coupled together in any configuration. For example, a first solar canopy may be coupled to a second solar canopy, which in turn may be coupled to both the first solar canopy and a third solar canopy. Continuing with this example, the third solar canopy may be coupled to both the second solar canopy and a forth solar canopy, and so on, with the solar canopies forming a row of coupled solar canopies. Alternatively, in one embodiment, a first solar canopy may be coupled to two or more additional solar canopies in a cluster of coupled solar canopies. Generally, this disclosure places no limitations on the configurations of the coupled solar canopies, which may, as will occur to one having ordinary skill in the art, be determined by the physical location in which the canopies are installed.

The physical location may also determine the number and type of mounting bases on which the solar canopies are mounted. For example, in one embodiment, each solar canopy is mounted on two distinct mounting bases (one at each end of the canopy), and the solar canopies are coupled to each other by attaching the coupling ground struts to the mounting bases of other solar canopies. In an alternate embodiment, the coupled solar canopies within one row are all mounted on two mounting bases (one at each end of the canopies) that extend parallel the length of the row of coupled solar canopies), and the solar canopies are coupled to each other by attaching the coupling ground struts to the portions of the mounting bases that are underneath the other solar canopies. In one embodiment, the solar canopies may be each mounted on two distinct mounting bases and coupled to each by attaching the coupling ground struts to one or more distinct mounting bases located between the coupled solar canopies. Further, in one embodiment to increase the structural integrity of the attachment points of the ground struts (lower-chord, upper-chord, and coupling) with the mounting bases, the mounting bases are designed so that, after attaching the ground struts, concrete (or other suitable material) may be poured over the attachment points of the ground struts to encase the attachment points in concrete.

In one embodiment, an apparatus, comprising: at least one mounting base; a first attachment point located on the at least one mounting base, wherein the first attachment point is located proximate a first solar canopy; a second attachment point located on the at least one mounting base, wherein the second attachment point is located proximate a second solar canopy; the first solar canopy comprising at least one first solar panel mounted on a first truss, wherein the first truss comprises at least two first upper chords and at least one first lower chord, wherein the first solar canopy is attached to the at least one mounting base via at least one first lower chord ground strut, wherein the at least one first lower chord ground strut is attached to the at least one first lower chord and the first attachment point; and the second solar canopy comprising at least one second solar panel mounted on a second truss, wherein the second truss comprises at least two second upper chords and at least one second lower chord, wherein the second solar canopy is attached to the at least one mounting base via at least one second lower chord ground strut, wherein the at least one second lower chord ground strut is attached to the at least one second lower chord and the second attachment point; a first coupling ground strut, wherein the first coupling ground strut is attached to the first truss and the second attachment point; and a second coupling ground strut, wherein the second coupling ground strut is attached to the second truss and the first attachment point.

In one embodiment, an apparatus, comprising: at least one intermediate mounting base, wherein the at least one intermediate mounting base is located between a first solar canopy and a second solar canopy; at least one first mounting base, wherein the at least one first mounting base is located beneath the first solar canopy; at least one second mounting base, wherein the at least one second mounting base is located beneath the second solar canopy; an attachment point located on the at least one intermediate mounting base; the first solar canopy comprising at least one first solar panel mounted on a first truss, wherein the first truss comprises at least two first upper chords and at least one first lower chord, wherein the first solar canopy is attached to the at least one first mounting base via at least one first lower chord ground strut, wherein the at least one first lower chord ground strut is attached to the at least one first lower chord and the at least one first mounting base; the second solar canopy comprising at least one second solar panel mounted on a second truss, wherein the second truss comprises at least two second upper chords and at least one second lower chord, wherein the second solar canopy is attached to the at least one second mounting base via at least one second lower chord ground strut, wherein the at least one second lower chord ground strut is attached to the at least one second lower chord and the at least one second mounting base; a first coupling ground strut, wherein the first coupling ground strut is attached to the first truss and the attachment point; and a second coupling ground strut, wherein the second coupling ground strut is attached to the second truss and the attachment point.

In one embodiment, an apparatus, comprising: at least one mounting base; a first solar canopy; a second solar canopy; a first attachment point located on the at least one mounting base, wherein the first attachment point is located proximate the first solar canopy; a second attachment point located on the at least one mounting base, wherein the second attachment point is located proximate the second solar canopy; a first coupling ground strut, wherein the first coupling ground strut is attached to the first solar canopy and the second attachment point; and a second coupling ground strut, wherein the second coupling ground strut is attached to the second solar canopy and the first attachment point.

According to one aspect of the present disclosure, the apparatus, wherein the at least one mounting base comprises a first mounting base located beneath the second solar canopy and a second mounting base located beneath the first solar canopy, wherein the first attachment point is located on the first mounting base and the second attachment point is located on the second mounting base. Furthermore, the apparatus, wherein the at least one first solar panel is oriented in a first plane and the at least one second solar panel is oriented in a second plane that is parallel to the first plane. Moreover, the apparatus, wherein the at least one first solar panel is oriented in a first plane and the at least one second solar panel is oriented in a second plane that intersects the first plane. Further, the apparatus, wherein the first coupling ground strut is attached to the first truss at the same point where the at least one first lower chord ground strut is attached to the at least one first lower chord and the second coupling ground strut is attached to the second truss at the same point where the at least one second lower chord ground strut is attached to the at least one second lower chord.

According to one aspect of the present disclosure, the apparatus, wherein: the first solar canopy is further attached to the at least one mounting base via at least one first upper chord ground strut, wherein the at least one first upper chord ground strut is attached to one of the at least two first upper chords and the first attachment point; and the second solar canopy is further attached to the at least one mounting base via at least one second upper chord ground strut, wherein the at least one second upper chord ground strut is attached to one of the at least two second upper chords and the second attachment point. Additionally, the apparatus, wherein the first coupling ground strut is attached to the first truss at the same point where the at least one first upper chord ground strut is attached to one of the at least two first upper chords and the second coupling ground strut is attached to the second truss at the same point where the at least one second upper chord ground strut is attached to one of the at least two second upper chords. Also, the apparatus, wherein the first and second attachment points are encased within a hardened substance. Furthermore, the apparatus, wherein the hardened substance comprises concrete.

According to one aspect of the present disclosure, the apparatus, wherein the at least one first solar panel is oriented in a first plane and the at least one second solar panel is oriented in a second plane that is parallel to the first plane. Moreover, the apparatus, wherein the at least one first solar panel is oriented in a first plane and the at least one second solar panel is oriented in a second plane that intersects the first plane. Further, the apparatus, wherein the first coupling ground strut is attached to the first truss at the same point where the at least one first lower chord ground strut is attached to the at least one first lower chord and the second coupling ground strut is attached to the second truss at the same point where the at least one second lower chord ground strut is attached to the at least one second lower chord.

According to one aspect of the present disclosure, the apparatus, wherein: the first solar canopy is further attached to the at least one first mounting base via at least one first upper chord ground strut, wherein the at least one first upper chord ground strut is attached to one of the at least two first upper chords and the at least one first mounting base; and the second solar canopy is further attached to the at least one second mounting base via at least one second upper chord ground strut, wherein the at least one second upper chord ground strut is attached to one of the at least two second upper chords and the at least one second mounting base. Additionally, the apparatus, wherein the first coupling ground strut is attached to the first truss at the same point where the at least one first upper chord ground strut is attached to one of the at least two first upper chords and the second coupling ground strut is attached to the second truss at the same point where the at least one second upper chord ground strut is attached to one of the at least two second upper chords. Also, the apparatus, wherein the attachment point is encased within a hardened substance. Furthermore, the apparatus, wherein the hardened substance comprises concrete.

According to one aspect of the present disclosure, the apparatus, wherein the at least one mounting base comprises a first mounting base located beneath the second solar canopy and a second mounting base located beneath the first solar canopy, wherein the first attachment point is located on the first mounting base and the second attachment point is located on the second mounting base. Moreover, the apparatus, wherein: the first solar canopy comprises at least one first solar panel mounted on a first truss, wherein the first truss comprises at least two first upper chords and at least one first lower chord, wherein the first solar canopy is attached to the at least one mounting base via at least one first lower chord ground strut, wherein the at least one first lower chord ground strut is attached to the at least one first lower chord and the first attachment point, and at least one first upper chord ground strut, wherein the at least one first upper chord ground strut is attached to one of the at least two first upper chords and the first attachment point; and wherein the second solar canopy comprising at least one second solar panel mounted on a second truss, wherein the second truss comprises at least two second upper chords and at least one second lower chord, wherein the second solar canopy is attached to the at least one mounting base via at least one second lower chord ground strut, wherein the at least one second lower chord ground strut is attached to the at least one second lower chord and the second attachment point, and at least one second upper chord ground strut, wherein the at least one second upper chord ground strut is attached to one of the at least two second upper chords and the second attachment point.

According to one aspect of the present disclosure, the apparatus, wherein the first coupling ground strut is attached to the first solar canopy at the same point where the at least one first lower chord ground strut is attached to the at least one first lower chord and the second coupling ground strut is attached to the second solar canopy at the same point where the at least one second lower chord ground strut is attached to the at least one second lower chord. Further, the apparatus, wherein the first coupling ground strut is attached to the first solar canopy at the same point where the at least one first upper chord ground strut is attached to one of the at least two first upper chords and the second coupling ground strut is attached to the second solar canopy at the same point where the at least one second upper chord ground strut is attached to one of the at least two second upper chords.

According to one aspect of the present disclosure, the apparatus, wherein the at least one first solar panel is oriented in a first plane and the at least one second solar panel is oriented in a second plane that is parallel to the first plane. Additionally, the apparatus, wherein the at least one first solar panel is oriented in a first plane and the at least one second solar panel is oriented in a second plane that intersects the first plane. Also, the apparatus, wherein the first and second attachment points are encased within a hardened substance. Furthermore, the apparatus, wherein the hardened substance comprises concrete.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
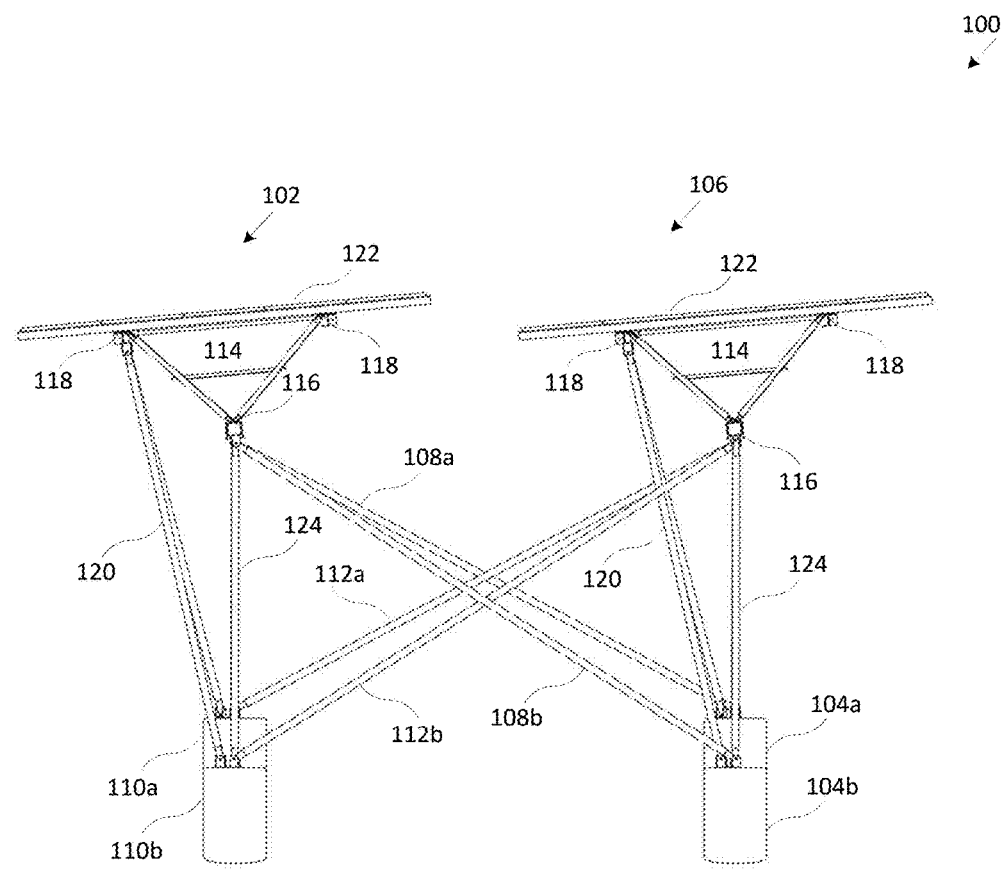
FIG. 1 is a side view of a pair of coupled canopies in accordance with one embodiment of this disclosure.

Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to apparatuses, systems, and methods for coupling adjacent solar canopies into a unitized structure to reduce wind loads on and increase the structural integrity of the solar canopies.

Generally, the disclosed apparatuses, systems, and methods utilize ground struts organized in a triangulated structure to attach a first solar canopy to the base of a second solar canopy and vice versa. In various embodiments, a solar canopy generally comprises a rectangular photovoltaic racking solution with at least one solar panel mounted on top of a triangular truss. Generally, the triangular truss comprises two upper chords (upon which the solar panel is mounted) and one lower chord, between which and to which various supports are attached. In various embodiments, the upper and lower chords of the triangular truss run the length of the rectangular solar canopies. At one end of the rectangular solar canopy, in one embodiment, the ground struts are used to attach the solar canopy to a mounting base on the ground. Similarly, at the other end of the rectangular solar canopy, in one embodiment, more of the ground struts are used to attach the solar canopy to another mounting base on the ground. In one embodiment, the truss and the ground struts are comprised of steel or other suitable material. As will occur to one having ordinary skill in the art, this disclosure places no limitations on the number, configurations, or types of solar canopies, solar panels, ground struts, or trusses that may be used in association with the present disclosure.

In one embodiment, the solar canopies are attached, via one or more upper-chord and lower-chord ground struts, to mounting bases resting or attached to the ground. To provide additional reduction of wind loads and increased structural integrity, adjacent solar canopies may be coupled together using one or more coupling ground struts. For example, a first coupling ground strut may be attached to a first solar canopy at one end and the mounting base of a second solar canopy at the other end. Similarly, a second coupling ground strut may be attached to the second solar canopy at one end and the mounting base of the first solar canopy at the other end. In various embodiments, by attaching a first solar canopy to a second solar canopy, the overall maximum wind loads on the solar canopies are reduced. By reducing the wind load on the solar canopies, the overall resistance required for the coupled solar canopies (to resist downforce and lift from the wind) is reduced. Thus, instead of building each solar canopy to resist a higher-maximum wind load, the solar canopies may be constructed to resist the lowered-maximum overall wind load—necessitating less materials, which affords a savings in cost for construction.

Any number of adjacent solar canopies may be generally coupled together in any configuration. For example, a first solar canopy may be coupled to a second solar canopy, which in turn may be coupled to both the first solar canopy and a third solar canopy. Continuing with this example, the third solar canopy may be coupled to both the second solar canopy and a forth solar canopy, and so on, with the solar canopies forming a row of coupled solar canopies. Alternatively, in one embodiment, a first solar canopy may be coupled to two or more additional solar canopies in a cluster of coupled solar canopies. Generally, this disclosure places no limitations on the configurations of the coupled solar canopies, which may, as will occur to one having ordinary skill in the art, be determined by the physical location in which the canopies are installed.

The physical location may also determine the number and type of mounting bases on which the solar canopies are mounted. For example, in one embodiment, each solar canopy is mounted on two distinct mounting bases (one at each end of the canopy), and the solar canopies are coupled to each other by attaching the coupling ground struts to the mounting bases of other solar canopies. In an alternate embodiment, the coupled solar canopies within one row are all mounted on two mounting bases (one at each end of the canopies) that extend parallel the length of the row of coupled solar canopies), and the solar canopies are coupled to each other by attaching the coupling ground struts to the portions of the mounting bases that are underneath the other solar canopies. In one embodiment, the solar canopies may be each mounted on two distinct mounting bases and coupled to each by attaching the coupling ground struts to one or more distinct mounting bases located between the coupled solar canopies. Further, in one embodiment to increase the structural integrity of the attachment points of the ground struts (lower-chord, upper-chord, and coupling) with the mounting bases, the mounting bases are designed so that, after attaching the ground struts, concrete (or other suitable material) may be poured over the attachment points of the ground struts to encase the attachment points in concrete.

Referring now to the figures, FIG. 1 is a side view 100 of a pair of coupled canopies in accordance with one embodiment of this disclosure. Generally, a solar canopy may be structurally coupled to one or more adjacent canopies with two or more coupling ground struts to reduce the wind load on the solar canopy. By reducing the wind load on the solar canopy, the overall resistance required for the coupled solar canopies (to resist downforce and lift from the wind) is reduced. Thus, instead of building each solar canopy to resist a higher-maximum wind load, the solar canopies may be constructed to resist the lowered-maximum overall wind load—necessitating less materials, which affords a savings in cost for construction, materials, etc.

In various embodiments, a first solar canopy 102 and a second solar canopy 106, in one embodiment, may comprise one or more solar panels 122 that are mounted on a triangular truss 114 comprising a lower chord 116 and two upper chords 118 (extending into the page in FIG. 1, also shown in FIGS. 3 and 4). Generally, the triangular trusses 114 are designed to support the weight of the solar panels 122. In various embodiments, the first solar canopy 102 and the second solar canopy 106 may be supported by one or more upper-chord ground struts 120 that are attached to the upper chords 118 of the trusses 114 and one or more mounting bases 104a, 104b, 110a, or 110b. Further, in various embodiments, the first solar canopy 102 and the second solar canopy 106 may be supported by one or more lower-chord ground struts 124 that are attached to the lower chords 116 of the trusses 114 and the mounting bases 104a, 104b, 110a, or 110b. Generally, this disclosure makes no limitation on the number, attachment points, or configuration of the upper-chord ground struts 120 and the lower-chord ground struts 124.

Generally, a first solar canopy 102 may be connected to the mounting base(s) 104a/104b of a second, adjacent solar canopy 106 with one or more coupling ground strut(s) 108a/108b designed to transfer tension and compression forces from the first canopy 102 to the mounting base(s) 104a/104b of the second canopy 106. In one embodiment, the second solar canopy 106 may be connected to the mounting base(s) 110a/110b of the first solar canopy 102 with one or more coupling ground strut(s) 112a/112b. The first solar canopy 102 and the second solar canopy 106, in one embodiment, may be supported by two pairs of mounting bases 110a/110b and 104a/104b that are both located at the same end of the first solar canopy 102 and the second solar canopy 106, respectively. Alternatively (not shown in FIG. 1 but shown in FIG. 4), only two mounting bases may be located at each end of the first solar canopy 102 and the second solar canopy 106 (e.g., 110a and 104a on one end and 110b and 104b on the other end).

In various embodiments, the first solar canopy 102 and the second solar canopy 106 may be mounted with the same inclination and orientation (as shown in FIGS. 1, 5, and 6) or with opposite inclinations and orientations (not shown in FIG. 1 but shown in FIGS. 2, 3, 4, and 7). Generally, the solar canopies 102 and 106 are installed with an inclination ranging from 0° to 45° and an orientation with the solar panels of the solar canopies 102 and 106 facing true south or true north. As will occur to one having ordinary skill in the art, this disclosure places no limitations on the inclinations or orientation of the solar canopies, which may be dependent on the physical location at which the solar canopies are installed.

Figure 2:
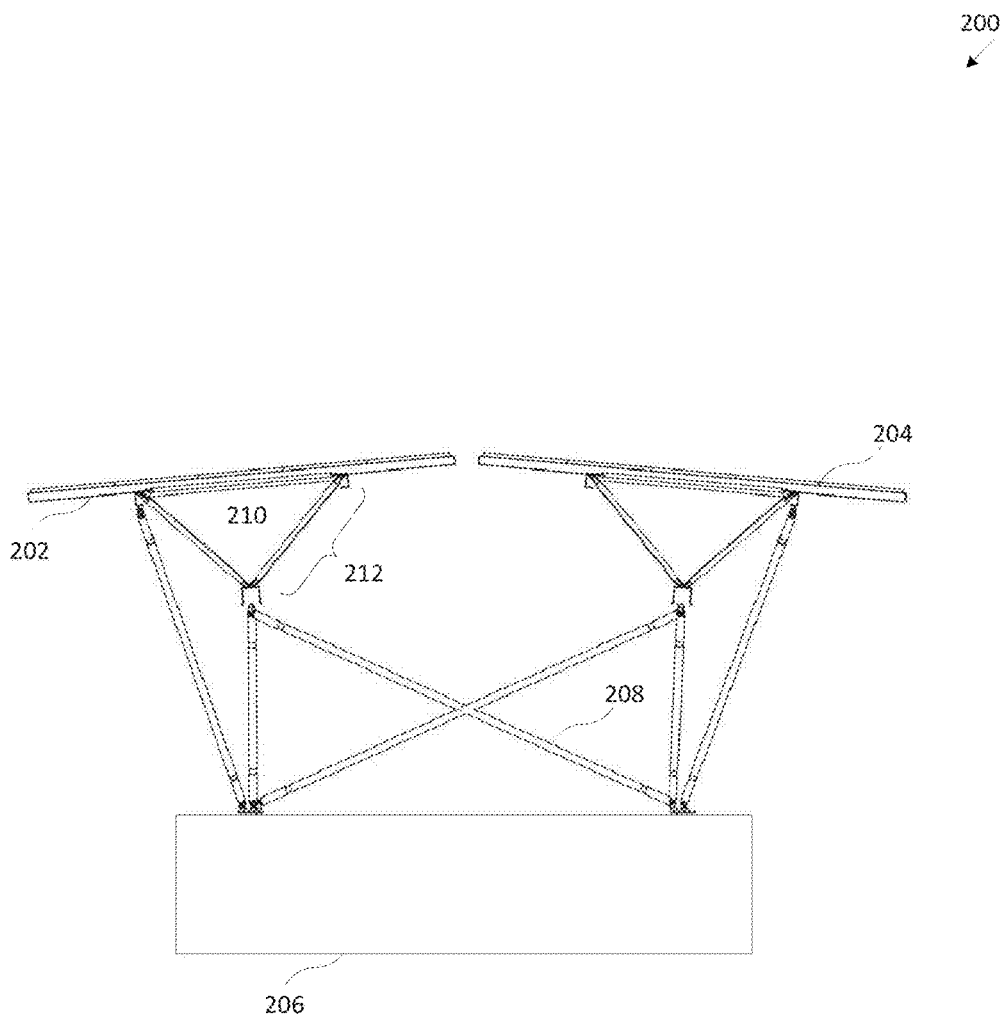
FIG. 2 is a side view of a pair of coupled canopies mounted on a unitary mounting base in accordance with one embodiment of this disclosure.
Figure 3A:
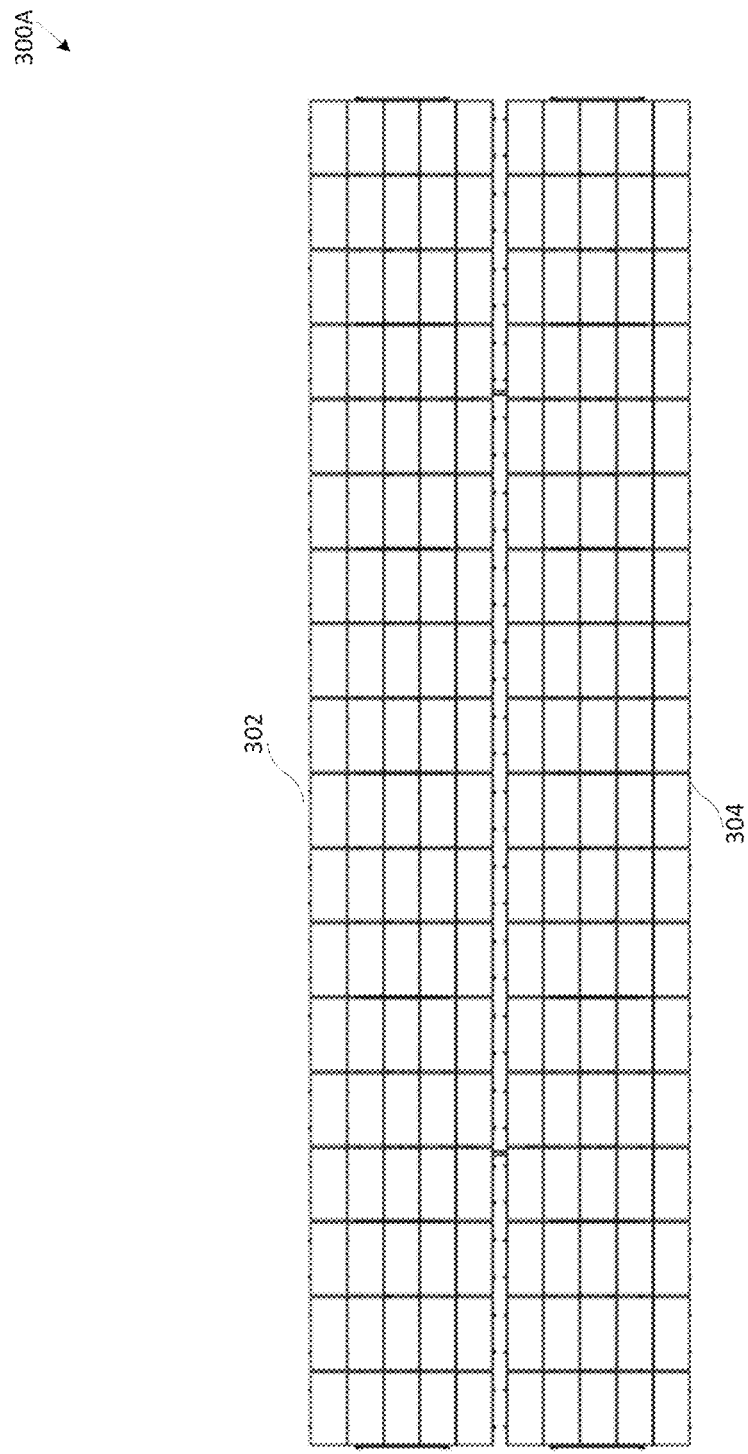
FIG. 3A depicts a top view of a pair of coupled canopies in accordance with one embodiment of this disclosure.
Figure 3B:
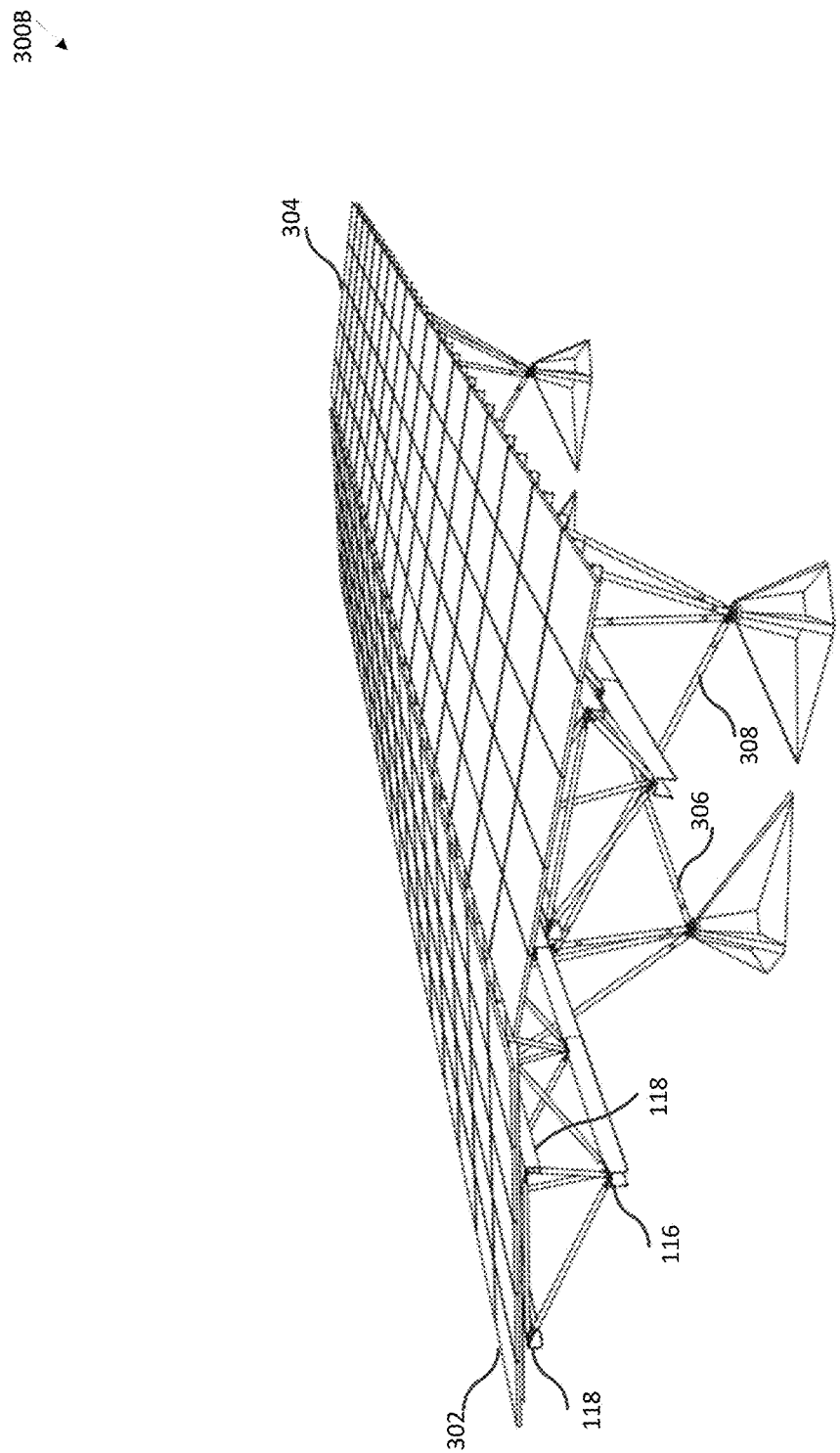
FIG. 3B depicts a perspective view of a pair of coupled canopies in accordance with one embodiment of this disclosure.
Figure 3C:
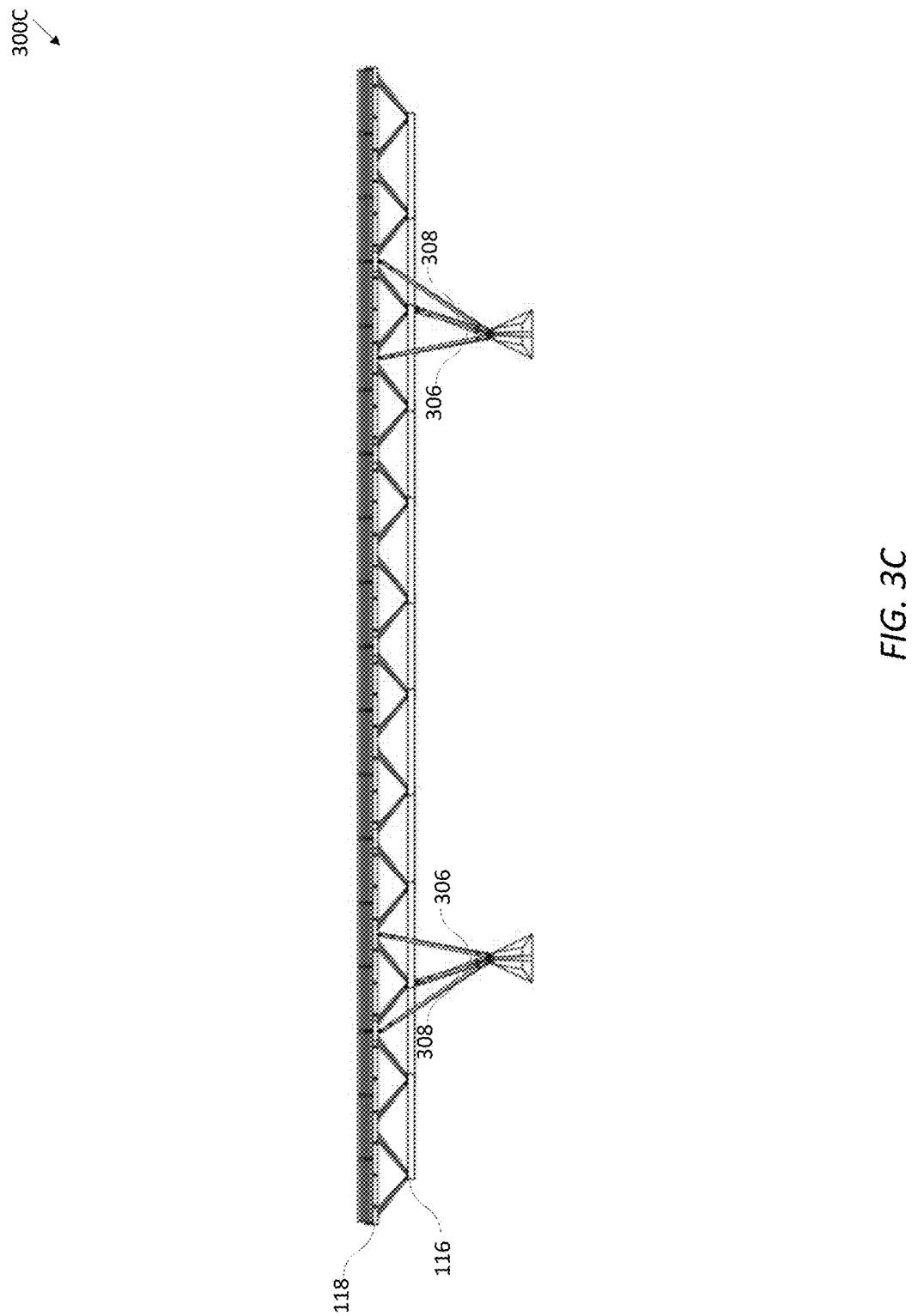
FIG. 3C depicts a longitudinal view of a pair of coupled canopies in accordance with one embodiment of this disclosure.
Figure 3D:
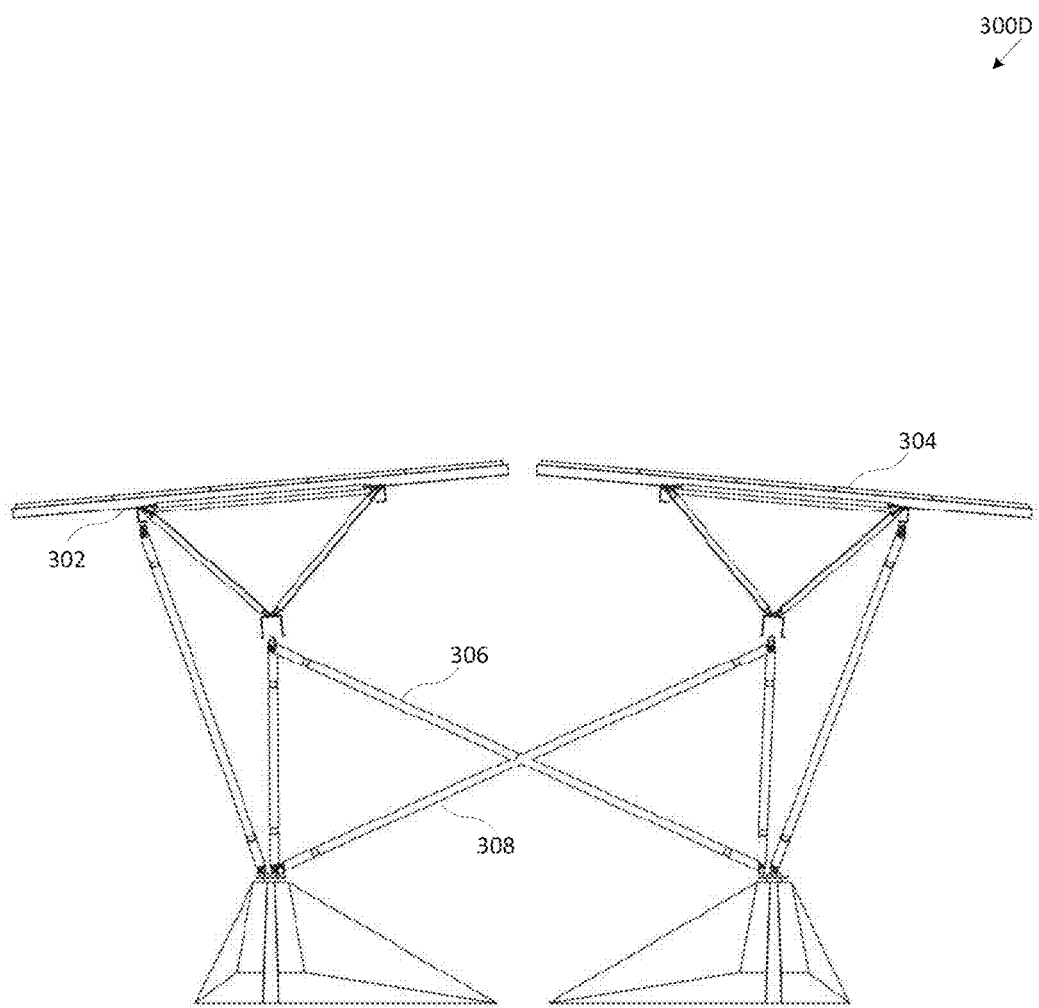
FIG. 3D depicts a latitudinal view of a pair of coupled canopies in accordance with one embodiment of this disclosure.
Figure 4A:
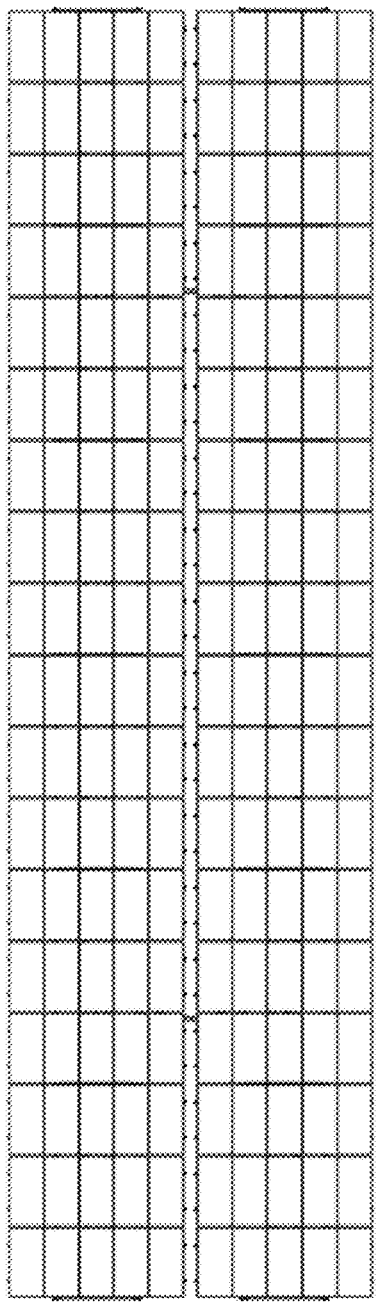
FIG. 4A depicts a top view of a pair of coupled canopies mounted on a compression platform in accordance with one embodiment of this disclosure.
Figure 4B:
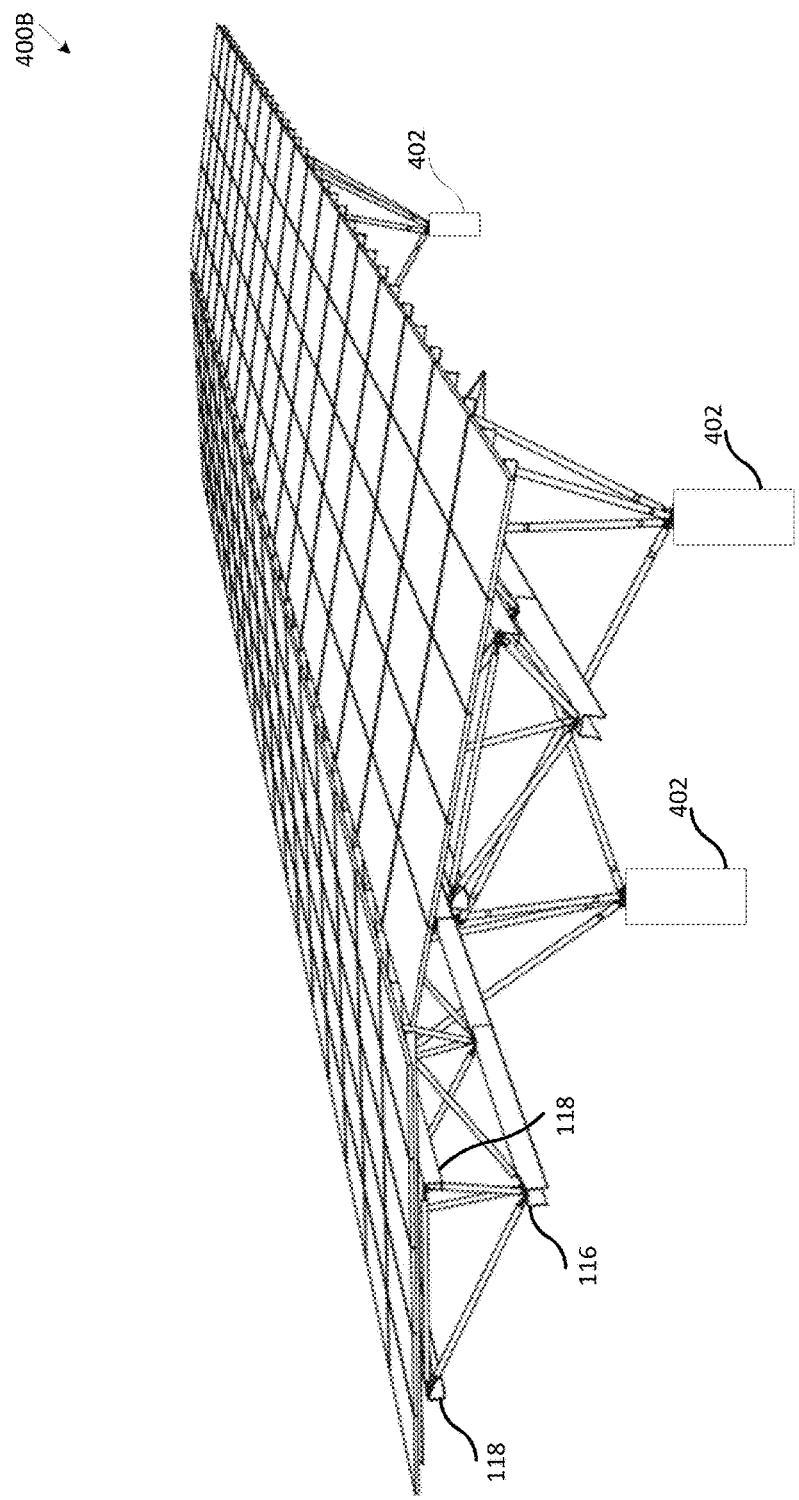
FIG. 4B depicts a perspective view of a pair of coupled canopies mounted on a compression platform in accordance with one embodiment of this disclosure.
Figure 4C:
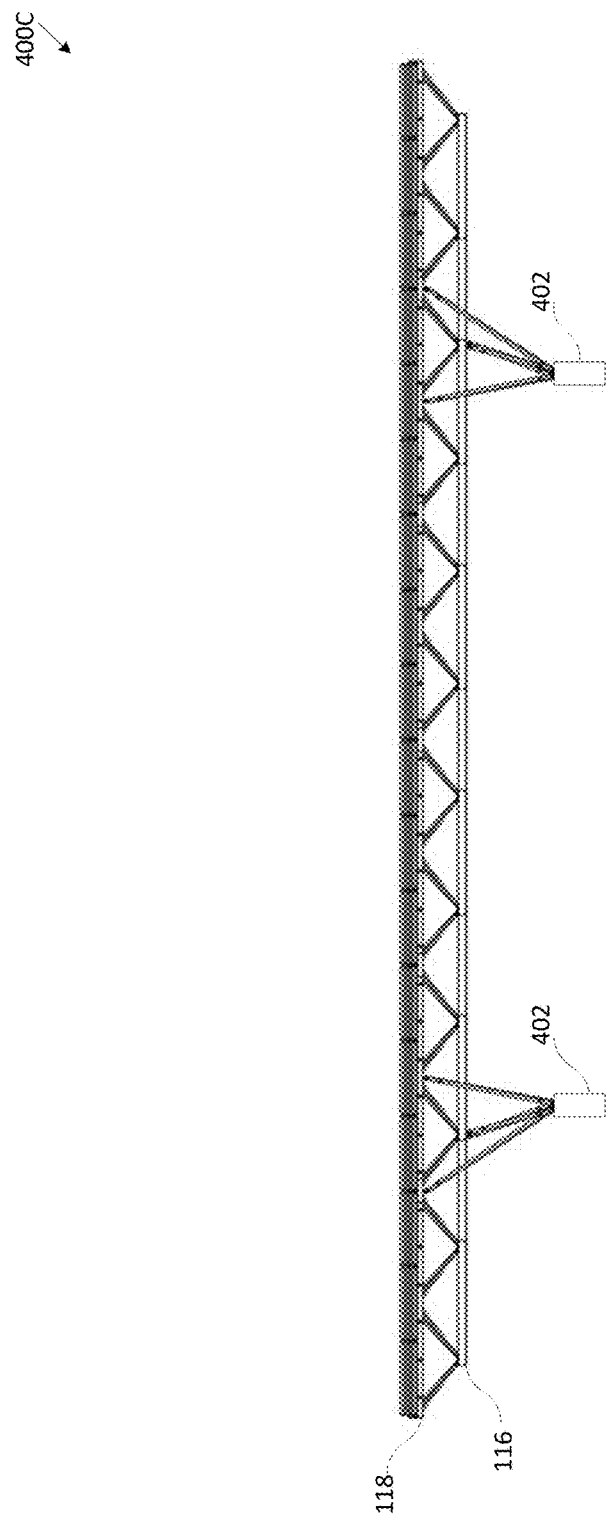
FIG. 4C depicts a longitudinal view of a pair of coupled canopies mounted on a compression platform in accordance with one embodiment of this disclosure.
Figure 4D:
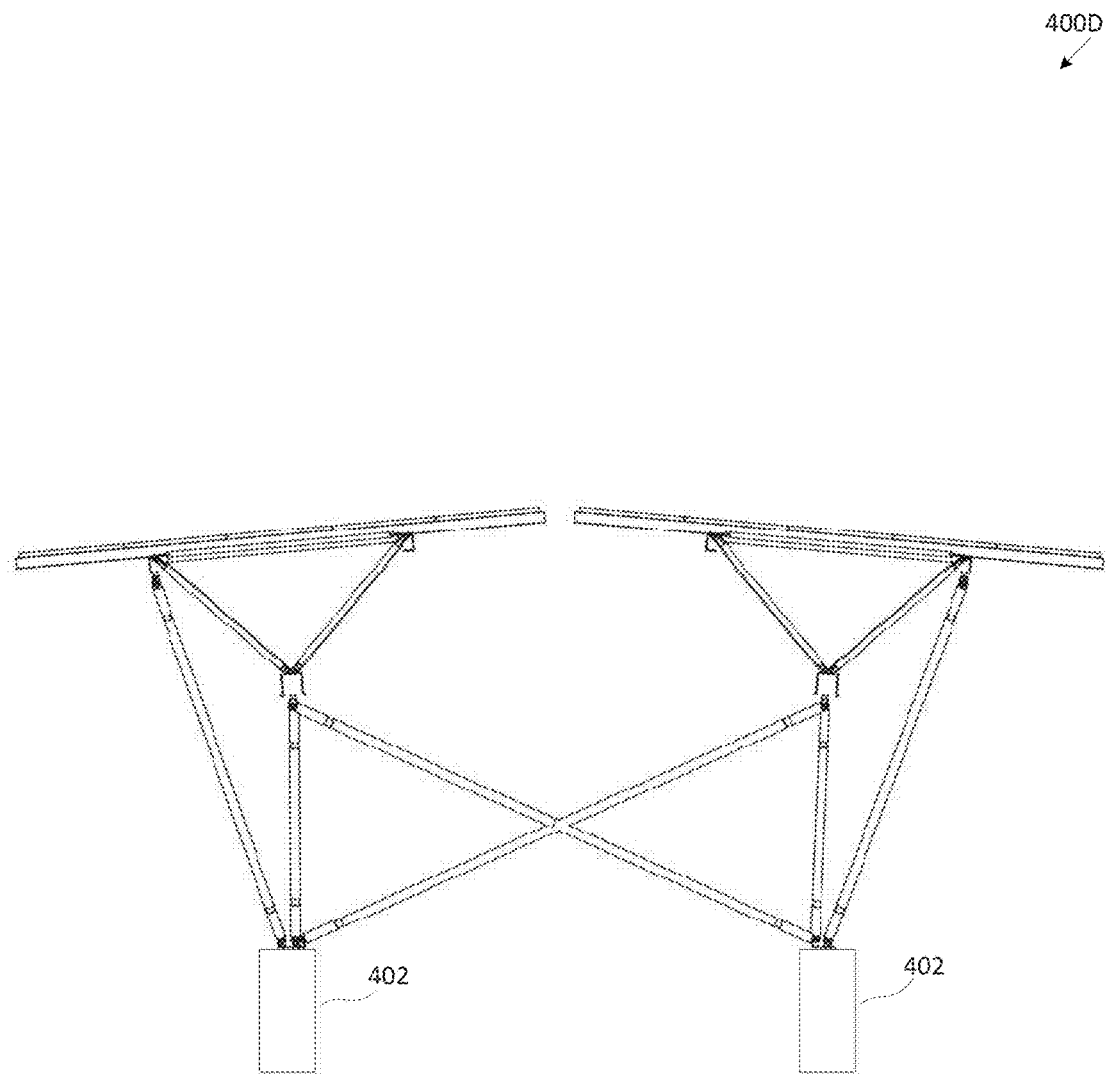
FIG. 4D depicts a latitudinal view of a pair of coupled canopies mounted on a compression platform in accordance with one embodiment of this disclosure.

Now referring to FIG. 2, a pair of coupled canopies mounted on a unitary mounting base is shown in accordance with one embodiment of this disclosure. In one embodiment, a first solar canopy 202 and a second solar canopy 204 may be mounted on the same unitary mounting base 206 as required by the physical location at which the solar canopies are installed instead of multiple mounting bases (as shown in FIG. 1).

Generally, the unitary mounting base 206, because of its size/mass, may comprise various different dimensions (e.g., tall vs. short, long and thin vs. wide, etc.) that have generally similar structural load capacities because, although the dimensions may be different, the overall size/mass does not change. Thus, the unitary mounting base 206 may replace multiple mounting bases as appropriate. For example, if the solar canopies 202 and 204 are to be installed in a parking lot, a unitary mounting base 206 that is long and thin may be installed at the ends of each aisle of parking spots to decrease the solar canopies' 202 and 204 impact on the space available for parking so that multiple mounting bases need not be installed amongst the parking spaces. Similarly, a long and thin mounting base 206 may be installed between parking spaces running parallel to the aisles so that car bumpers would be parked against the mounting base 206 when parked in the parking spaces.

In one embodiment, a coupling ground strut 208 may be attached to the truss 210 at any point in the span 212 between the lower chord and one of the upper chords.

Referring now to FIG. 3 (consisting of FIGS. 3A, 3B, 3C, and 3D), a pair of coupled canopies in accordance with one embodiment of this disclosure is shown in different views (top view 300A, perspective view 300B, longitudinal view 300C, and latitudinal view 300D, respectively). In one embodiment, a first solar canopy 302 may be installed with a fixed low tilt inclination and a second solar canopy 304 may be structurally coupled to the first canopy 302 (as described in FIG. 1, with coupling ground struts 306 and 308) and installed with a similar low tilt inclination but in the opposite orientation such that the systems may be installed in even closer proximity (e.g., less than 24 inches, etc.) enabling the first canopy 302 to function as an even more effective wind shelter for the second canopy 304.

Generally, the solar canopies 302 and 304 are installed with an inclination ranging from 0° to 45° and an orientation with the solar panels of the solar canopies 302 and 304 facing true south or true north. As will occur to one having ordinary skill in the art, this disclosure places no limitations on the inclinations or orientation of the solar canopies, which may be dependent on the physical location at which the solar canopies are installed.

Now referring to FIG. 4 (consisting of FIGS. 4A, 4B, 4C, and 4D), a pair of coupled canopies mounted on a compression platform 402 in accordance with one embodiment of this disclosure is shown in different views (top view 400A, perspective view 400B, longitudinal view 400C, and latitudinal view 400D, respectively). Generally, a pair of structurally coupled solar canopies, which utilize their weight to resist wind loads, may be mounted on a compression platform 402 to fix strut positions and transfer gravity loads to a parking lot surface or ground. In one embodiment, said compression platform 402 may be resting on the ground similar to a pedestal. In alternative embodiments, the compression platform 402 may be a part of a peer, post, or pile in the ground.

Figure 5A:
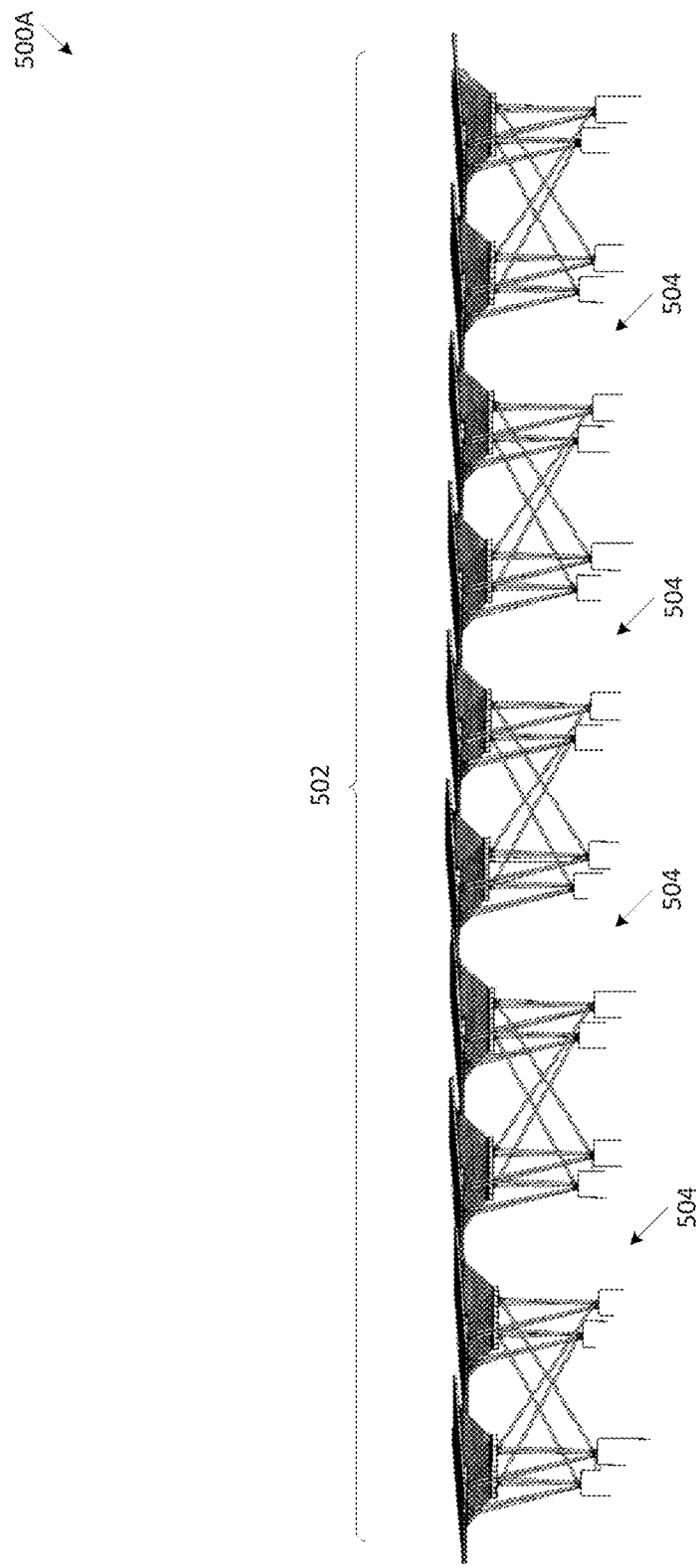
FIG. 5A depicts a side view of five pairs of coupled canopies in accordance with one embodiment of this disclosure.
Figure 5B:
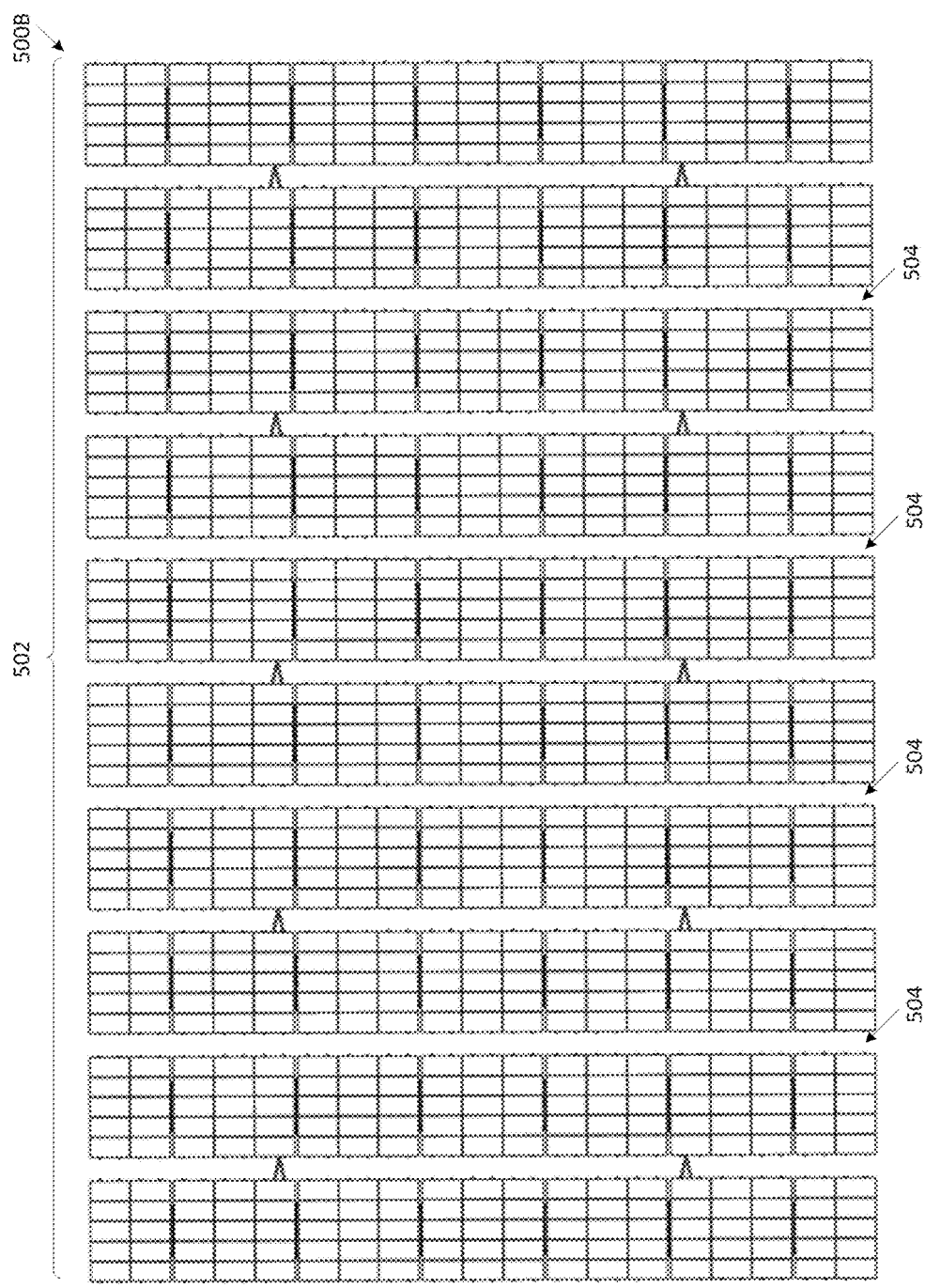
FIG. 5B depicts a top view of five pairs of coupled canopies in accordance with one embodiment of this disclosure.

Referring now to FIG. 5, (consisting of FIGS. 5A and 5B), five pairs of coupled canopies are shown according to one embodiment of the present disclosure in different views (side view 500A, top view 400B). As will be understood, the present disclosure places no limitation on the number or configuration of solar canopies that may be coupled together.

Generally, while the wind-load reduction benefit is greatest with larger numbers of coupled solar canopies, in one particular embodiment, an array 502 of ten solar canopies may be organized into five coupled pairs so that the overall maximum wind load is distributed across all five coupled pairs of the array 502. For example, one design requirement that may motivate pairing is a need to provide drive aisles 504 through the array 502 so that cars may drive between the pairs in the array 502 that is located in a parking lot. Regardless of the number of solar canopies that are coupled together, the weight (e.g., 3 pounds per square foot, 5 pounds per square foot, etc.) of a single pair of coupled canopies may reduce the wind loads by greater than 50% such that the self-weight of the structure is adequate to resist wind uplift and downforce loads (which, as will occur to one having ordinary skill in the art, are dependent on surface area, wind speed, wind dynamic pressure, pressure coefficient, etc.).

Although not shown in FIG. 5, if drive aisles 504 are not needed within the array 502, then the pairs of coupled canopies may also be coupled together so that the array 502 comprises ten canopies coupled together.

Figure 6A:
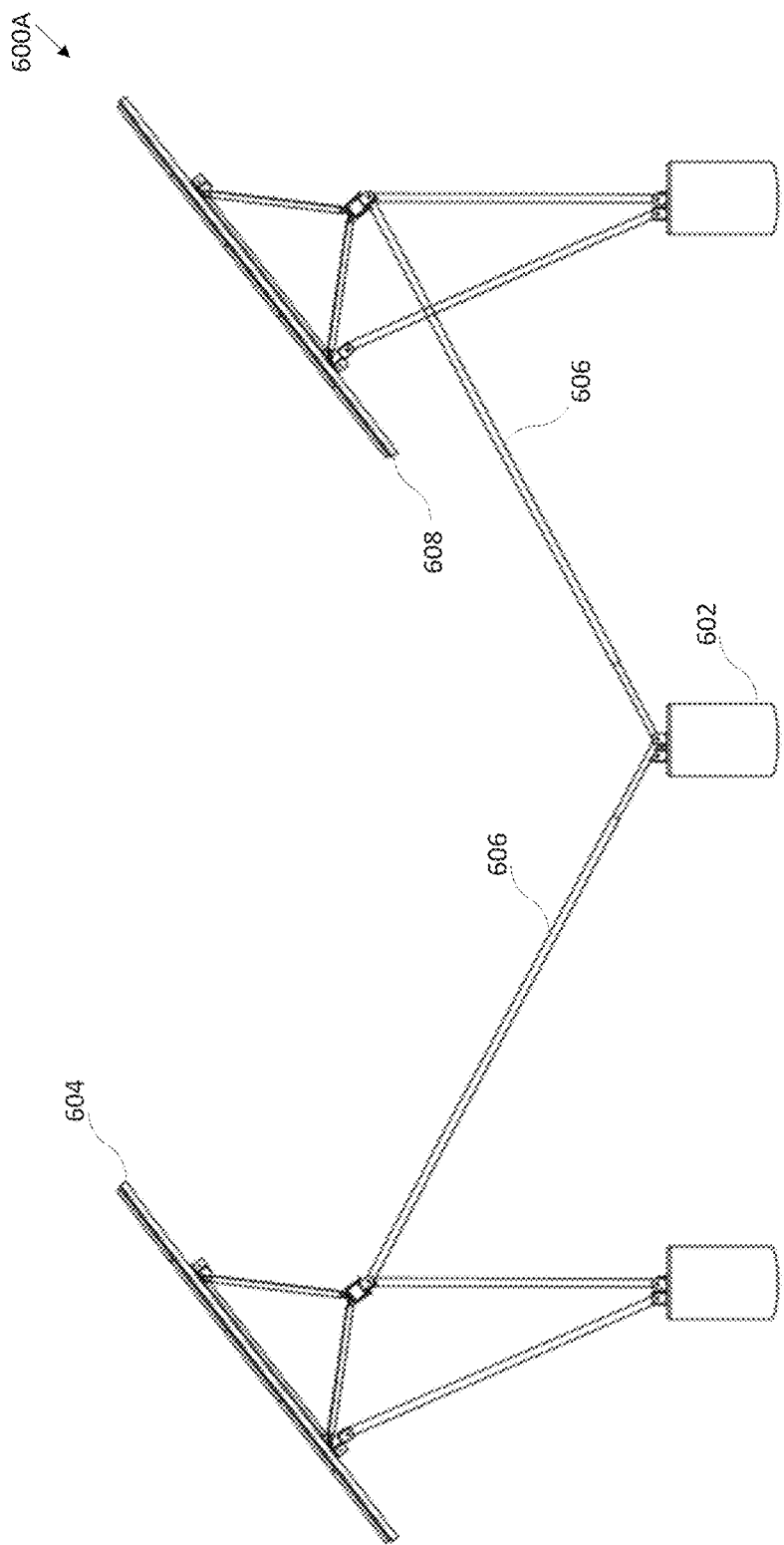
FIG. 6A depicts a pair of coupled canopies attached at an intermediate base in accordance with one embodiment of this disclosure.
Figure 6B:
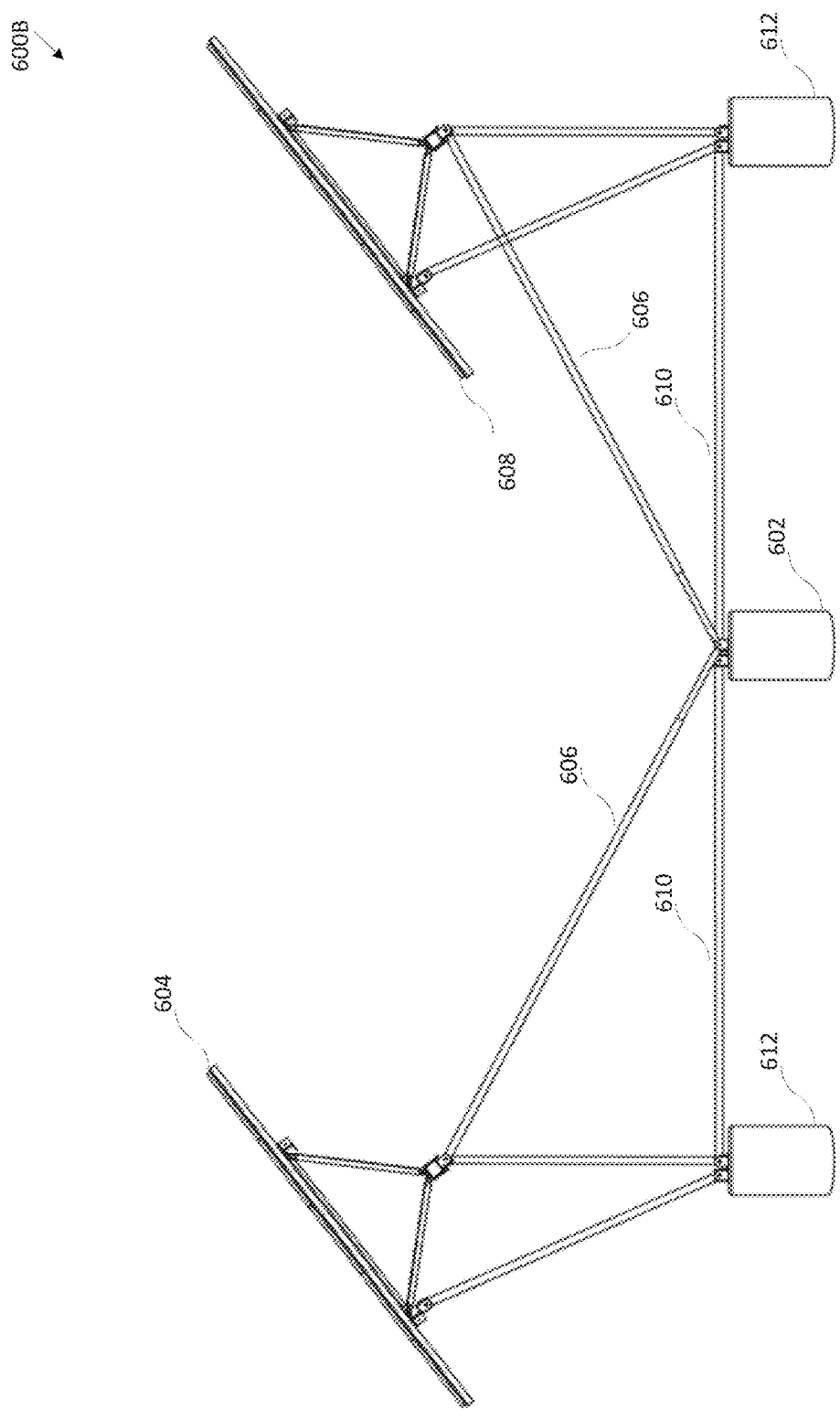
FIG. 6B depicts a pair of coupled canopies attached at an alternative intermediate base in accordance with one embodiment of this disclosure.

Now referring to FIG. 6, (consisting of FIGS. 6A and 6B), a pair of coupled canopies are shown with intermediate mounting bases according to one embodiment of the present disclosure. In various embodiments, where a larger gap between solar canopies is needed for reasons such as shading, canopies may be coupled together via an intermediate mounting base 602 (e.g., compression platform, intermediate base, etc.) such that the first canopy 604 is attached with a coupling ground strut 606 to the intermediate mounting base 602 and a second canopy 608 is also attached to the same intermediate mounting base 602 via a couple ground strut 610. Alternatively, additional struts 610 may be attached between the mounting bases 612 of the solar canopies 604 and 608 and the intermediate mounting base 602. Generally, additional struts 610 provide additional structural integrity to the coupled canopies. In one embodiment, the intermediate mounting base 602 may have more structural capacity than the mounting bases 612 (e.g., the mounting base 602 is larger, heavier, more securely fastened to the ground, etc.).

Figure 7:
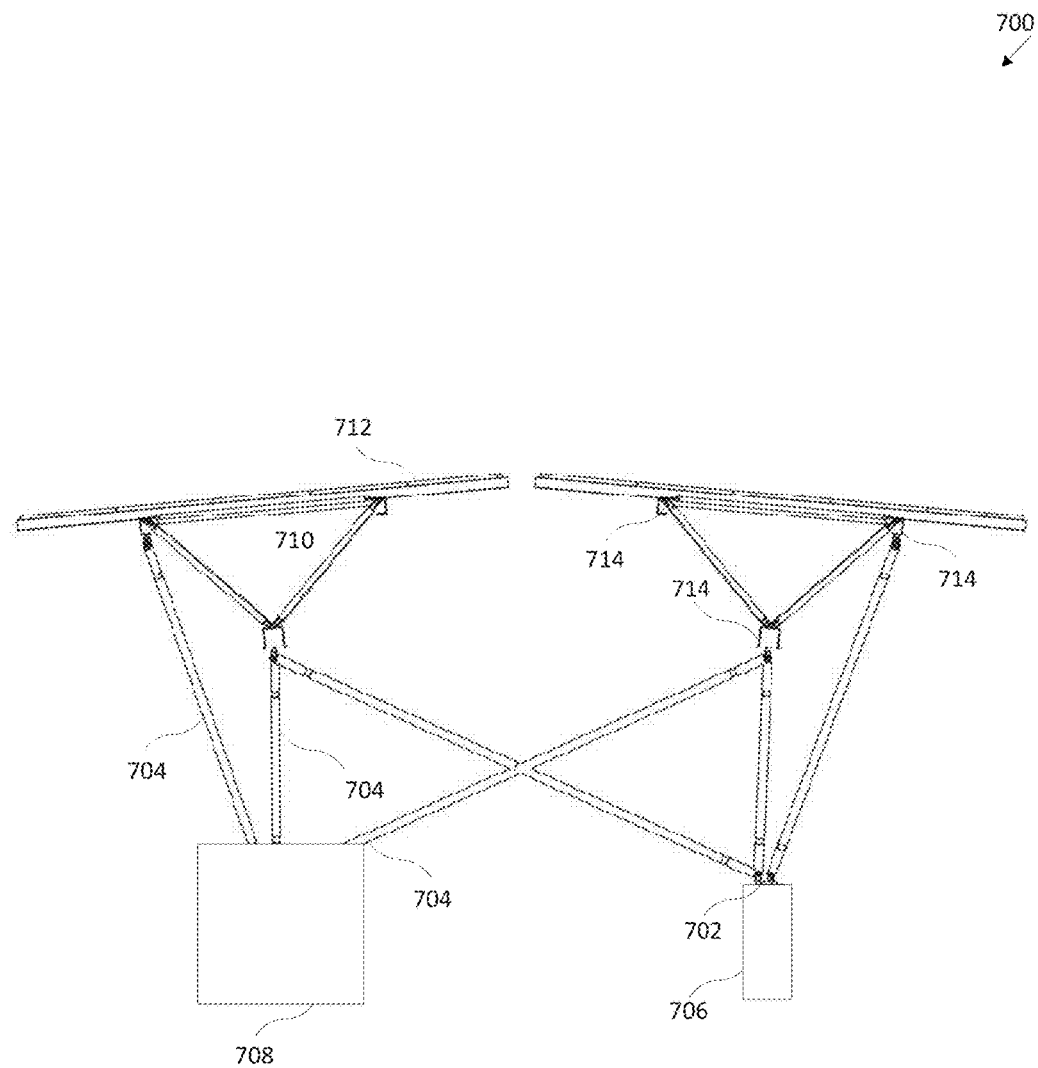
FIG. 7 is a side view of a pair of coupled canopies mounted with an attachment point encased in concrete.

Referring now to FIG. 7, a pair of coupled canopies is shown with an attachment point encased in concrete according to one embodiment of the present disclosure. As will be understood, only one attachment point is shown encased in concrete for ease of explanation/reference. The un-encased attachment point generally comprises all of the features of the encased attachment point except that it is not encased in concrete.

Generally, to increase the structural integrity of the attachment points 702 of the ground struts 704 (lower-chord, upper-chord, and coupling—as described in association with the description of FIG. 1) with the mounting bases 706, the mounting bases 706 may be designed so that, after attaching the ground struts 704, concrete 708 (or other suitable material such as gravel, mortar, other hardened material, etc.) may be poured over the attachment points 702 of the ground struts 704 to encase the attachment points 702 in concrete 708. In various embodiments, encasing the attachment points 702 in concrete 708 reduces the rotation of the ground struts 704, which increases the structural integrity of the coupled canopies 700. Thus, installation of the coupled canopies 700 would occur by assembling the trusses 710, mounting the solar panels 712, attaching the ground struts 704 to the trusses 710 and the attachment points 702 of the mounting bases 706, and pouring concrete 708 over the attachment points 702. In one embodiment, once the ground struts 704 are attached to the attachment points 702, the entire assembly may be welded together.

In various embodiments, the coupling ground struts may be attached at any attachment points 714 along the trusses 710 (including attachment points unlabeled in FIG. 7). Generally, the attachment points 702 and 714 comprise points along the mounting base 706 and trusses 710 that are manufactured to accept the ends of the ground struts 704. For example, the attachment points 702 and 714 may comprise a hole and the ground struts 704 may have a corresponding hole that may be aligned with the hole in the attachment points 702 and 714 to enable insertion of a bolt that is fastened to secure the ground struts 704.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

What is claimed is:

1. An apparatus, comprising:
at least one mounting base;
a first attachment point located on the at least one mounting base, wherein the first attachment point is located proximate a first solar canopy;
a second attachment point located on the at least one mounting base, wherein the second attachment point is located proximate a second solar canopy;
the first solar canopy comprising at least one first solar panel mounted on a first truss, wherein the first truss comprises at least two first upper chords and at least one first lower chord, wherein the first solar canopy is attached to the at least one mounting base via at least one first lower chord ground strut, wherein the at least one first lower chord ground strut is attached to the at least one first lower chord and the first attachment point;
the second solar canopy comprising at least one second solar panel mounted on a second truss, wherein the second truss comprises at least two second upper chords and at least one second lower chord, wherein the second solar canopy is attached to the at least one mounting base via at least one second lower chord ground strut, wherein the at least one second lower chord ground strut is attached to the at least one second lower chord and the second attachment point;
a first coupling ground strut, wherein the first coupling ground strut is attached to the first truss and the second attachment point; and
a second coupling ground strut, wherein the second coupling ground strut is attached to the second truss and the first attachment point.

2. The apparatus of claim 1, wherein the at least one mounting base comprises a first mounting base located beneath the second solar canopy and a second mounting base located beneath the first solar canopy, wherein the first attachment point is located on the second mounting base and the second attachment point is located on the first mounting base.

3. The apparatus of claim 1, wherein the at least one first solar panel is oriented in a first plane and the at least one second solar panel is oriented in a second plane that is parallel to the first plane.

4. The apparatus of claim 1, wherein the at least one first solar panel is oriented in a first plane and the at least one second solar panel is oriented in a second plane that intersects the first plane.

5. The apparatus of claim 1, wherein the first coupling ground strut is attached to the first truss at the same point where the at least one first lower chord ground strut is attached to the at least one first lower chord and the second coupling ground strut is attached to the second truss at the same point where the at least one second lower chord ground strut is attached to the at least one second lower chord.

6. The apparatus of claim 1, wherein:
the first solar canopy is further attached to the at least one mounting base via at least one first upper chord ground strut, wherein the at least one first upper chord ground strut is attached to one of the at least two first upper chords and the first attachment point; and
the second solar canopy is further attached to the at least one mounting base via at least one second upper chord ground strut, wherein the at least one second upper chord ground strut is attached to one of the at least two second upper chords and the second attachment point.

7. The apparatus of claim 6, wherein the first coupling ground strut is attached to the first truss at the same point where the at least one first upper chord ground strut is attached to one of the at least two first upper chords and the second coupling ground strut is attached to the second truss at the same point where the at least one second upper chord ground strut is attached to one of the at least two second upper chords.

8. The apparatus of claim 1, wherein the first and second attachment points are encased within a hardened substance.

9. The apparatus of claim 8, wherein the hardened substance comprises concrete.

10. An apparatus, comprising:
at least one intermediate mounting base, wherein the at least one intermediate mounting base is located between a first solar canopy and a second solar canopy;
at least one first mounting base, wherein the at least one first mounting base is located beneath the first solar canopy;
at least one second mounting base, wherein the at least one second mounting base is located beneath the second solar canopy;
an attachment point located on the at least one intermediate mounting base;
the first solar canopy comprising at least one first solar panel mounted on a first truss, wherein the first truss comprises at least two first upper chords and at least one first lower chord, wherein the first solar canopy is attached to the at least one first mounting base via at least one first lower chord ground strut, wherein the at least one first lower chord ground strut is attached to the at least one first lower chord and the at least one first mounting base;
the second solar canopy comprising at least one second solar panel mounted on a second truss, wherein the second truss comprises at least two second upper chords and at least one second lower chord, wherein the second solar canopy is attached to the at least one second mounting base via at least one second lower chord ground strut, wherein the at least one second lower chord ground strut is attached to the at least one second lower chord and the at least one second mounting base;
a first coupling ground strut, wherein the first coupling ground strut is attached to the first truss and the attachment point; and
a second coupling ground strut, wherein the second coupling ground strut is attached to the second truss and the attachment point.

11. The apparatus of claim 10, wherein the at least one first solar panel is oriented in a first plane and the at least one second solar panel is oriented in a second plane that is parallel to the first plane.

12. The apparatus of claim 10, wherein the at least one first solar panel is oriented in a first plane and the at least one second solar panel is oriented in a second plane that intersects the first plane.

13. The apparatus of claim 10, wherein the first coupling ground strut is attached to the first truss at the same point where the at least one first lower chord ground strut is attached to the at least one first lower chord and the second coupling ground strut is attached to the second truss at the same point where the at least one second lower chord ground strut is attached to the at least one second lower chord.

14. The apparatus of claim 10, wherein:
the first solar canopy is further attached to the at least one first mounting base via at least one first upper chord ground strut, wherein the at least one first upper chord ground strut is attached to one of the at least two first upper chords and the at least one first mounting base; and
the second solar canopy is further attached to the at least one second mounting base via at least one second upper chord ground strut, wherein the at least one second upper chord ground strut is attached to one of the at least two second upper chords and the at least one second mounting base.

15. The apparatus of claim 10, wherein the first coupling ground strut is attached to the first truss at the same point where the at least one first upper chord ground strut is attached to one of the at least two first upper chords and the second coupling ground strut is attached to the second truss at the same point where the at least one second upper chord ground strut is attached to one of the at least two second upper chords.

16. The apparatus of claim 10, wherein the attachment point is encased within a hardened substance.

17. The apparatus of claim 16, wherein the hardened substance comprises concrete.

18. An apparatus, comprising:
at least one mounting base;
a first solar canopy, wherein the first solar canopy comprises at least one first solar panel mounted on a first truss, wherein the first truss comprises at least two first upper chords and at least one first lower chord, and wherein the first solar canopy is attached to the at least one mounting base via at least one first lower chord ground strut, wherein the at least one first lower chord ground strut is attached to the at least one first lower chord and the first attachment point, and at least one first upper chord ground strut, wherein the at least one first upper chord ground strut is attached to one of the at least two first upper chords and the first attachment point;
a second solar canopy, wherein the second solar canopy comprises at least one second solar panel mounted on a second truss, wherein the second truss comprises at least two second upper chords and at least one second lower chord, and wherein the second solar canopy is attached to the at least one mounting base via at least one second lower chord ground strut, wherein the at least one second lower chord ground strut is attached to the at least one second lower chord and the second attachment point, and at least one second upper chord ground strut, wherein the at least one second upper chord ground strut is attached to one of the at least two second upper chords and the second attachment point;
a first attachment point located on the at least one mounting base, wherein the first attachment point is located proximate the first solar canopy;
a second attachment point located on the at least one mounting base, wherein the second attachment point is located proximate the second solar canopy;
a first coupling ground strut, wherein the first coupling ground strut is attached to the first solar canopy and the second attachment point; and
a second coupling ground strut, wherein the second coupling ground strut is attached to the second solar canopy and the first attachment point.

19. The apparatus of claim 18, wherein the at least one mounting base comprises a first mounting base located beneath the second solar canopy and a second mounting base located beneath the first solar canopy, wherein the first attachment point is located on the second mounting base and the second attachment point is located on the first mounting base.

20. The apparatus of claim 18, wherein the first coupling ground strut is attached to the first solar canopy at the same point where the at least one first lower chord ground strut is attached to the at least one first lower chord and the second coupling ground strut is attached to the second solar canopy at the same point where the at least one second lower chord ground strut is attached to the at least one second lower chord.

21. The apparatus of claim 18, wherein the first coupling ground strut is attached to the first solar canopy at the same point where the at least one first upper chord ground strut is attached to one of the at least two first upper chords and the second coupling ground strut is attached to the second solar canopy at the same point where the at least one second upper chord ground strut is attached to one of the at least two second upper chords.

22. The apparatus of claim 18, wherein the at least one first solar panel is oriented in a first plane and the at least one second solar panel is oriented in a second plane that is parallel to the first plane.

23. The apparatus of claim 18, wherein the at least one first solar panel is oriented in a first plane and the at least one second solar panel is oriented in a second plane that intersects the first plane.

24. The apparatus of claim 18, wherein the first and second attachment points are encased within a hardened substance.

25. The apparatus of claim 24, wherein the hardened substance comprises concrete.

* * * * *